Patented Jan. 2, 1945

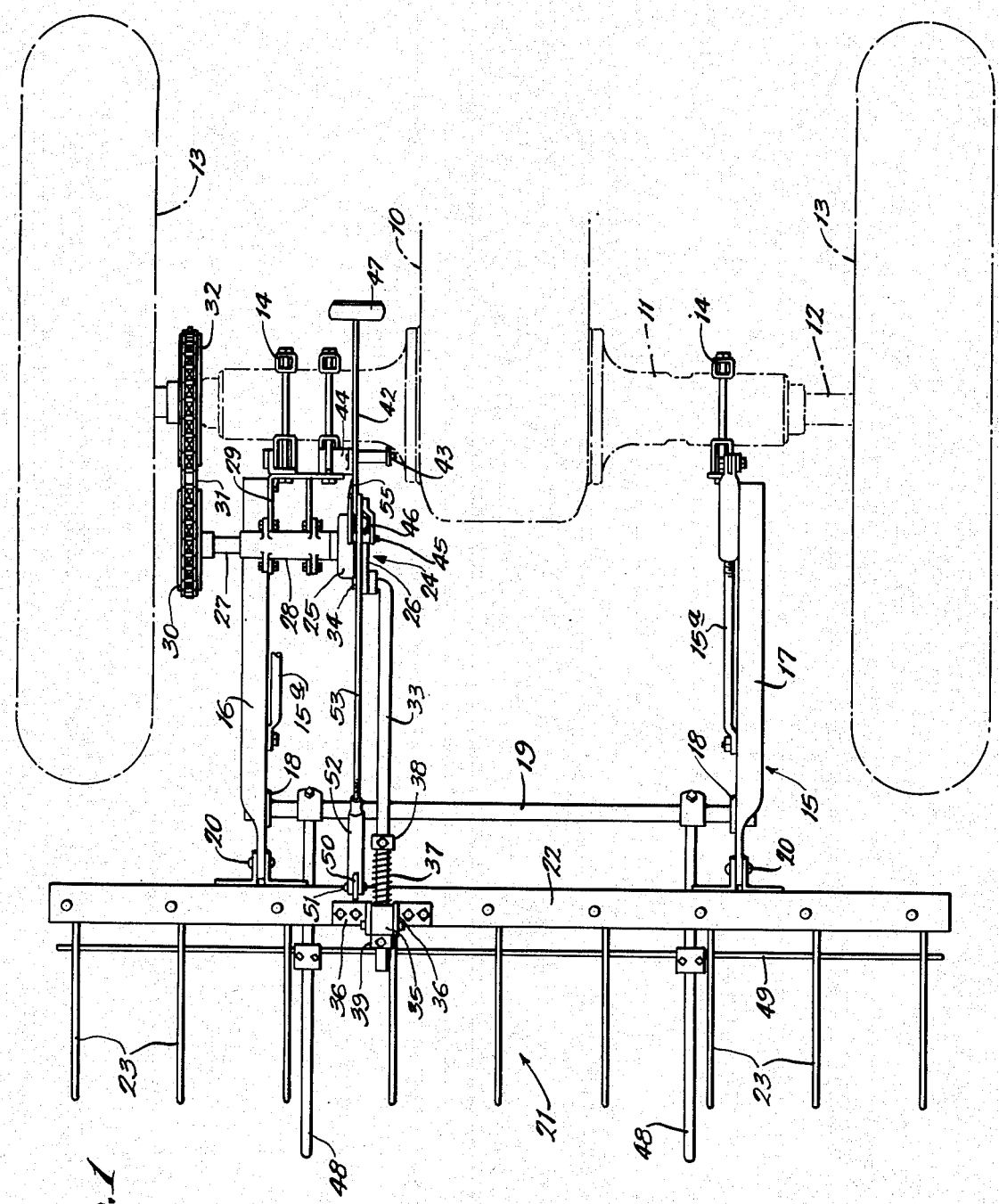

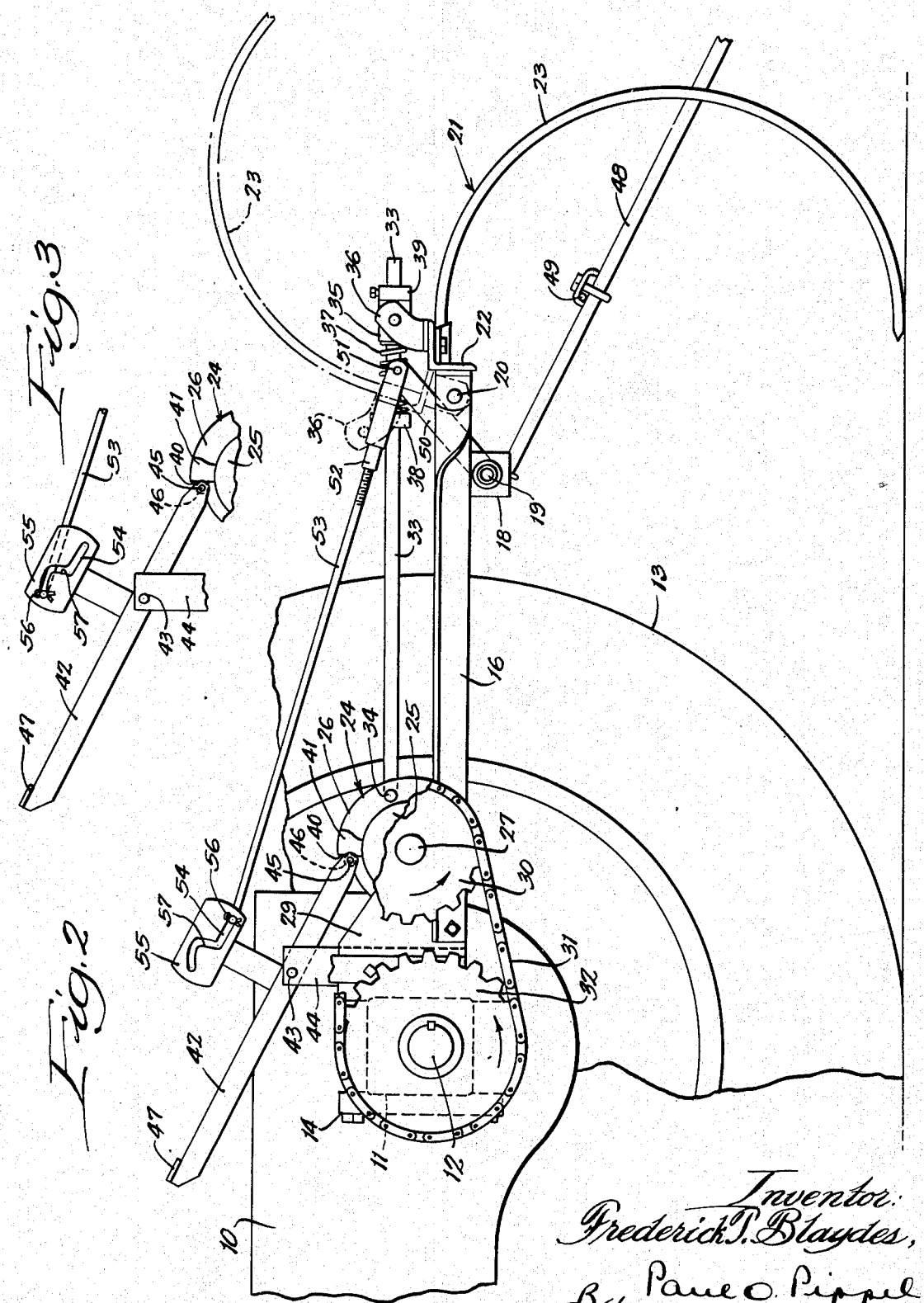

2,366,234

UNITED STATES PATENT OFFICE 2,366,234

DUMP RAKE

Frederick T. Blaydes, Canton, Ill., assignor to International Harvester Company, a corporation of New Jersey Application October 25, 1943, Serial No. 507,542

10 Claims. (Cl. 56—27)

This invention relates to agriculture implements, and more particularly to tractor-mounted rakes.

An object of the invention is the provision of a new and improved tractor-mounted rake supported entirely upon the tractor and under the control of the tractor operator.

Another object is the provision of a rake which is automatically dumped when a predetermined mass of vegetation has been gathered.

A further object is the provision in a tractor-mounted rake of means for optionally dumping the rake manually or automatically in response to the accumulation of vegetation.

Still another object is the provision in a tractor-mounted dump rake of means for automatically dumping the rake by power derived from the tractor.

These and other objects will become clear from the following detailed description when read in conjunction with the accompanying drawings, wherein Figure 1 is a plan view of the rear end of a tractor showing the rake of the present invention mounted thereupon;

Figure 2 is a view in side elevation of the implement shown in Figure 1 and illustrating the mechanism by which the rake is dumped; and Figure 3 is a detail of the mechanism shown in Figure 2.

Referring to the drawings, the numeral 10 designates the longitudinally extending body portion of a tractor having a rear axle structure 11. Axle structure 11 journals a rear axle 12 mounting at opposite ends thereof drive wheels 13. Supported upon rear axle structure 11 by means of brackets 14, and projecting rearwardly therefrom, is a frame structure 15 comprising laterally spaced parallel members in the form of angle bars 16 and 17 each having a downwardly projecting bracket 18 journaling opposite ends of a transverse rock-shaft 19. The rearwardly extending ends of members 16 and 17 are flattened and apertured to receive pins 20 upon which is pivotally mounted a rake head 21. Rake head 21 comprises a transversely extending angle member 22 having downwardly curved fingers 23 attached thereto. Frame 15 is vertically braced by an adjustable rod 15a attached to an extension of bracket 14.

Vertical pivotal movement of rake head 21 about pins 20 to effect dumping thereof is accomplished by means of a conventional half revolution clutch 24, comprising a constantly rotating member 25 and an intermittently rotating member 26, mounted upon a shaft 27 journaled in a bearing 28 supported in a bracket 29, affixed to bracket 14 on the left side of the tractor. Constantly rotating member 25, mounted on shaft 27, is driven by means of a sprocket 30 keyed to the shaft and connected by a chain drive 31 to a sprocket 32 splined on rear axle 12.

Intermittently rotating member 26 serves as a crank for effecting reciprocation of a rod 33 pivoted at one end on member 26, as at 34. Rod 33 extends rearwardly and passes through a trunnion 35 mounted between lugs 36 affixed to the rake head. Flexibility is provided by a spring 37 surrounding rod 33 and abutting the trunnion and a collar 38. A collar 39 is keyed to rod 33 adjacent the end thereof for abutment against trunnion 35. Intermittently rotating member 26 of clutch 24 is provided with two peripheral notches 40, spaced 180 degrees apart, and a conventional dog member 41 adapted in a manner well known for engagement with constantly rotating member 25. Member 26 and dog 41 are normally held out of engagement with member 25 by a lever 42 pivoted at 43 upon a standard 44 attached to the rear axle structure 11, and bifurcated rearwardly to receive a pin 45 mounting a roller 46, adapted to engage the notch 40 and dog 41 to hold member 26 against rotation. The forwardly extending end of lever 42 is provided with a pedal 47 accessible to the tractor operator for manually actuating clutch 24. Upon depressing pedal 47 and releasing roller 46 from notch 40 and engagement with dog 41, member 26 rotates one-half revolution until the second notch is encountered. The point of connection of rod 33 to member 26 is thus moved a half revolution to raise the rake head about its pivot point 20 to the position indicated in dotted lines in Figure 2. The rake head is returned to its working position by a repetition of the operation just described.

It should now be clear that a simple and efficient dump rake has been described which is supported entirely upon and powered from the tractor, and the operation of which is under the manual control of the tractor operator. In order to render the dumping operation entirely automatic, rearwardly extending arms 48 are attached to rock-shaft 19 and connected by an elongated transverse rod 49. When the rake is in operating position, arms 48 and rod 49 are adapted to rest upon the accumulating mass of detached vegetation and to pivot upwardly as the quantity of vegetation increases due to the pressure thereof. Likewise affixed to rock-shaft 19 is an upwardly projecting arm 50, apertured to receive a pin 51 upon which is pivoted the bifurcated rear end of a sleeve 52, interiorly threaded to receive the threaded end of a rod 53. The forwardly extending end of rod 53 is bent for insertion in the lower portion of a Z-shaped slot 54 in a member 55 affixed to lever 42, and is held against displacement from the slot by a cotter key 56.

As vegetation is accumulated by the rake head the arms 48 pivot upwardly, rocking shaft 19 and arm 50 in a counterclockwise direction as viewed in Figure 2, forcing rod 53 rearwardly in the slot 54 until shoulder portion 57 is reached, whereupon lever 42 is rocked to release roller 46 from notch 40 and actuate the clutch in the manner previously outlined.

When it is desired to raise the rake head and maintain it in raised position for transport purposes, the clutch 24 may be actuated manually or automatically to place the rake head in dumping position; the rod 53 is then manually lifted by the operator until it rests in the upper portion of slot 54, as shown in Figure 3. In this position no pressure is exerted to rock lever 42 and further actuate the clutch to return the rake head to working position.

Having now described the invention it should be understood that modifications may be made therein without departing from the spirit of the invention or the scope of the appended claims.

What is claimed is:

1. A tractor mounted dump rake for gathering detached vegetation comprising a frame attached to the tractor and supported thereby, a toothed rake head supported entirely upon said frame and pivoted thereon for vertical swinging movement to and from dumping position, means mounted on the tractor and driven therefrom for dumping said rake head, and means responsive to the increasing mass of detached vegetation gathered by said rake head for actuating said dumping means.

2. A tractor mounted dump rake for gathering detached vegetation comprising a frame attached to the tractor and supported thereby, a toothed rake head supported entirely upon said frame and pivoted thereon for vertical swinging movement to and from dumping position, means mounted on the tractor and driven therefrom for dumping said rake head, a rock-shaft on said frame, arms on said rock shaft arranged to rest upon the gathered vegetation and to be moved thereby to rock said rock-shaft, and means responsive to the rocking of said shaft for actuating said dumping means.

3. In combination with a tractor, a rake for gathering detached vegetation and advancing it with the tractor, means for moving said rake to and from operative position, and means responsive to the increasing mass of advanced vegetation for moving said rake periodically to inoperative position, said last mentioned means including a rock-shaft on the rake, a power operated clutch on the tractor, means operatively connecting said rake and said clutch for moving said rake to and from operative position, and means on said rock-shaft responsive to increasing thickness of the advanced vegetation for actuating said clutch.

4. In an agricultural implement for advancing detached plants over a field and dumping them in spaced bunches, in combination, a tractor, a rearwardly extending frame attached to the tractor and supported thereby, a rake head pivoted on the frame for vertical swinging movement and having rake teeth adapted to gather and advance the detached plants, a rock-shaft on said frame, means responsive to the increasing mass of said plants for rocking said rock shaft, a constantly rotating driving member on the tractor, a driven member on the tractor adapted for engagement with said driving member, means operatively connecting said rake head and said driven member for vertically swinging said rake head to dumping position, means on the tractor for normally locking said driven member out of engagement with said driving member, and means responsive to the rocking of said rock-shaft for releasing locking means.

5. In an agricultural implement for advancing detached plants over a field and dumping them in spaced bunches, in combination, a tractor, a rearwardly extending frame attached to the tractor and supported thereby, a rake head pivoted on the frame for vertical swinging movement and having rake teeth adapted to gather and advance the detached plants, a rock-shaft on said frame, means responsive to the increasing mass of said plants for rocking said rock-shaft, a constantly rotating driving member on the tractor, a driven member on the tractor adapted for engagement with said driving member, means operatively connecting said rake head and said driven member for vertically swinging said rake head to dumping position, manually operable means on the tractor for normally holding said driven member out of engagement with said driving member, and connecting means between said rock-shaft and said manually operable means for optionally releasing said holding means in response to rocking of said rock-shaft.

6. In an agricultural implement for advancing detached plants over a field and dumping them in spaced bunches, in combination, a tractor, a rearwardly extending frame attached to the tractor and supported thereby, a rake head pivoted on the frame for vertical swinging movement and having rake teeth adapted to gather and advance the detached plants, a rock-shaft on said frame, means responsive to the increasing mass of said plants for rocking said rock-shaft, a constantly rotating driving member on the tractor, a driven member on the tractor adapted for engagement with said driving member, means operatively connecting said rake head and said driven member for vertically swinging said rake head to dumping position, means on the tractor for normally locking said driven member out of engagement with said driving member, and means responsive to the rocking of said rock-shaft, including a lost motion connection, for releasing said locking means upon a predetermined rocking movement of said rock-shaft.

7. In a dump rake for gathering and depositing detached vegetation in bunches, in combination, a tractor, a frame supported entirely by the tractor, a rake head pivoted on the frame for vertical movement, a clutch mounted on the tractor and including a constantly rotating member and an intermittently rotating member, power means on the tractor for driving said constantly rotating member, means connecting said rake head and said intermittently rotating member to effect pivoting of said rake head, and means responsive to the increasing mass of detached vegetation gathered by said rake head for actuating said clutch to effect rotation of said intermittently rotatable member.

8. In a dump rake for gathering and depositing detached vegetation in bunches, in combination, a tractor, a frame supported entirely by the tractor, a rake head pivoted on the frame for vertical movement, a clutch mounted on the tractor and including a constantly rotating member and an intermittently rotating member, power means on the tractor for driving said constantly rotating member, means connecting said rake head and said intermittently rotating member to effect pivoting of said rake head, a rock-shaft on said frame, arms on said rock-shaft arranged to rest upon the growing mass of gathered vegetation and to pivot upwardly with the increasing diameter thereof, and means responsive to the rocking of said rock-shaft for actuating said clutch.

9. In a dump rake for gathering and depositing detached vegetation in bunches, in combination, a tractor, a frame supported entirely by the tractor, a rake head pivoted on the frame for vertical movement, a clutch mounted on the tractor and including a constantly rotating member and an intermittently rotating member, power means on the tractor for driving said constantly rotating member, means connecting said rake head and said intermittently rotating member to effect pivoting of said rake head, means for holding said intermittently rotating member out of engagement with said constantly rotating member, a rock-shaft on said frame, means for rocking said rock-shaft in response to the increasing mass of said gathered vegetation, an arm on said rock-shaft, and connecting means between said arm and said holding means to release said holding means upon a predetermined rocking movement of said rock arm.

10. The combination with a tractor having a rear axle and drive wheels, of a dump rake including a frame carried by the tractor and a rake head pivoted on the frame for movement to and from dumping position, clutch means on the tractor, means connecting said clutch and said rake head to effect dumping thereof, means transmitting power from said rear axle to said clutch for actuation thereof, and means including a lost motion connection responsive to the accumulation of vegetation by said rake head for actuating said clutch.

FREDERICK T. BLAYDES.